Jan. 11, 1949.  S. D. SHEARMAN  2,459,005

PIPE JOINT

Filed March 5, 1946

INVENTOR
SPICER D. SHEARMAN

BY *Bair & Freeman*

ATTORNEYS

Patented Jan. 11, 1949

2,459,005

UNITED STATES PATENT OFFICE 2,459,005

PIPE JOINT

Spicer Douglass Shearman, Bryan, Ohio, assignor to The Aro Equipment Corporation, Bryan, Ohio, a corporation of Ohio Application March 5, 1946, Serial No. 652,123

3 Claims. (Cl. 285—90)

My present invention relates to a follower plate for grease or lubricant and adapted to be placed on the lubricant in a container, the plate being designed for connection of a grease gun barrel therewith for the purpose of filling the barrel from the container.

One object of the invention is to provide a follower plate which has means for sealingly connecting a hand gun therewith.

Another object is to provide the connecting means operable to effect a seal without the necessity of screwing the hand gun barrel to the follower plate or using some other type of complicated and time consuming means of connection.

More specifically, it is my object to provide a resilient sleeve connected to a follower plate and adapted to coact with a grease gun barrel by merely inserting the end of the barrel into the sleeve, the sleeve having an internal annular bead adapted to make sealing contact with the outer surface of the hand gun barrel regardless of whether it is smooth, threaded or provided with a bayonet joint or the like.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1:
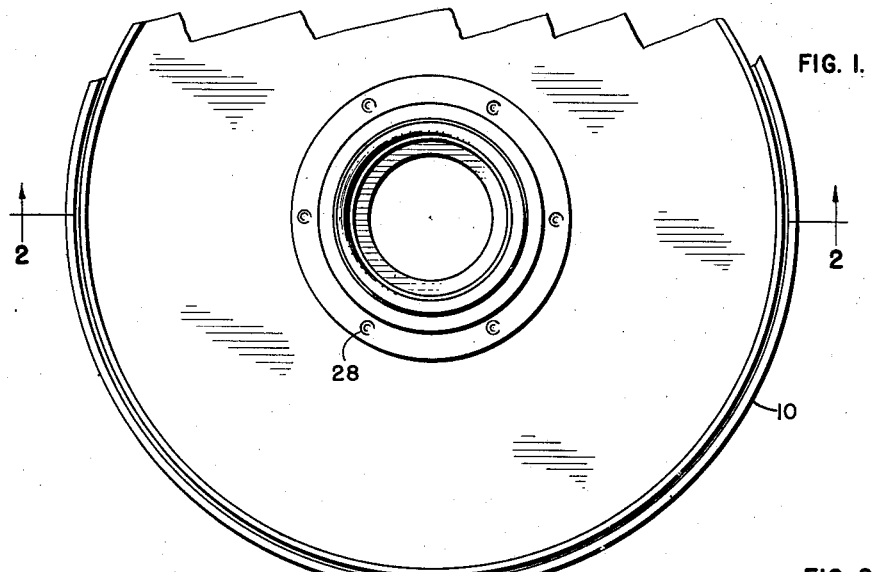
Fig. 1 is a plan view of a follower plate embodying my invention.

On the accompanying drawings, I have used the reference numeral 10 to indicate the peripheral wall of a grease bucket or similar container having a bottom wall 12. The container 10 is adapted to contain lubricant, grease or the like 14 and within the container a follower plate 16 rests on the lubricant 14.

Figure 2:
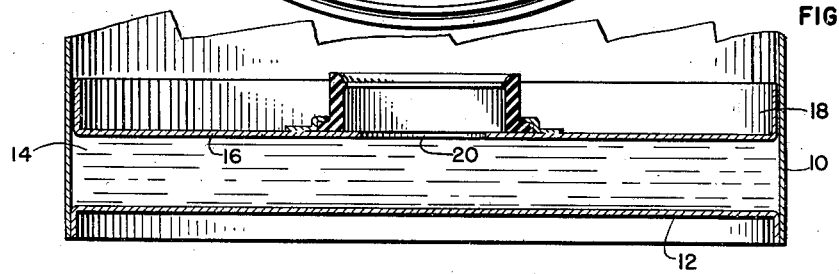
Fig. 2 is a sectional view on the line 2—2 of Figure 1.
Figure 3:
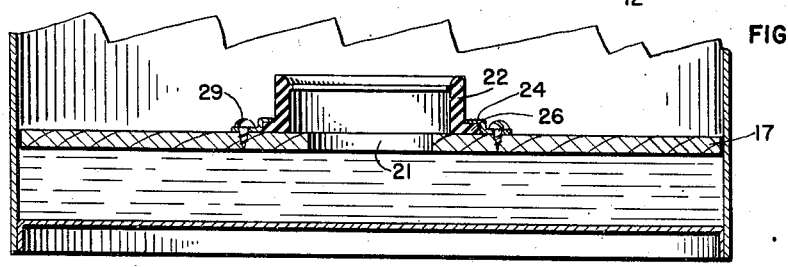
Fig. 3 is a similar sectional view showing a modified construction of plate.

In Figure 2, the follower plate is shown of steel construction with an annular peripheral flange 18. In Figure 3, a modified follower plate 17 is illustrated, made of wood or the like.

The follower plates 16 and 17 have central openings 20 and 21. Mounted on the follower plate I provide a sleeve 22. The sleeve 22 has a flange 24 confined in an annular metal ring 26 of offset cross-sectional shape. This ring may be spot welded as at 28 to the follower plate 10 or where the plate is wood such as shown at 17 it may be provided with suitable openings through which wood screws 29 extend into the follower plate.

Figure 4:
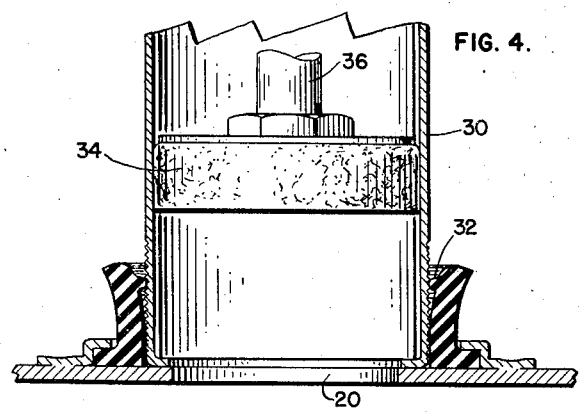
Fig. 4 is an enlarged view of the central portion of Figure 2 showing the coaction of a hand gun barrel with a sealing and connecting sleeve on the follower plate.

The internal diameter of the sleeve 22 is preferably and approximately the external diameter of a hand gun barrel 30 as shown in Figure 4 and provided with an annular inwardly directed bead 32. The bead thereby serves, under pressure of the sleeve 22 tending to retain its original shape as in Figure 2, to sealingly grip the outer wall of the barrel 30. Thus a seal is effected regardless of whether the outer surface of the barrel is smooth, threaded as shown or provided with bayonet connections or the like for normal connection to the head of a grease gun.

The sleeve 22 is of suitable resilient material such as oil resistant rubber or some kind of synthetic rubber so as to effect the desired gripping action without the necessity of having to provide a gasket and threaded type of connector between the follower plate and the grease gun when filling it. The device thereby serves as a quick connector and permits also quick disconnection. When the parts are connected as in Figure 4, the piston 34 in the grease gun can be retracted by pulling on the piston rod 36 thereby drawing grease in through the opening 20 and causing the follower plate to follow the grease level, wiping the grease off the side wall 10 of the container.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A follower plate structure for a grease gun including a barrel comprising a follower plate element, and means for connecting the grease gun barrel thereto comprising a sleeve connected with the follower plate and adapted to receive the grease gun barrel, said sleeve being of resilient material for gripping and sealing against the barrel, and having an internal bead adapted to be expanded over the barrel without substantial distortion.

2. A grease gun follower plate, and means for connecting the same to a grease gun barrel comprising a resilient sleeve having an out-turned flange, a ring surrounding said flange and connected to the follower plate, said sleeve adjacent its outer end having an internal annular bead adapted to be expanded over the barrel without substantial distortion.

3. A grease gun follower plate, and means for connecting the same to a grease gun barrel comprising a resilient sleeve, a ring surrounding said sleeve and connected to the follower plate, said sleeve adjacent its outer end having an internal annular bead adapted to be expanded over the barrel without substantial distortion.

SPICER DOUGLASS SHEARMAN.

REFERENCES CITED

The following references are of record in the file of this patent:

FOREIGN PATENTS

| Number | Country | Date |
|---|---|---|
| 2,975 | Great Britain | Feb. 12, 1901 |
| 331,310 | Great Britain | July 3, 1930 |